United States Patent
Tang et al.

(10) Patent No.: US 11,774,032 B2
(45) Date of Patent: Oct. 3, 2023

(54) BIAXAL PIVOTING MECHANISM AND ANGLE ADJUSTMENT DEVICE

(71) Applicant: WISTRON CORP., New Taipei (TW)

(72) Inventors: Miaochun Tang, New Taipei (TW); Ji Tao Li, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/207,819

(22) Filed: Mar. 22, 2021

(65) Prior Publication Data

US 2022/0186874 A1      Jun. 16, 2022

(30) Foreign Application Priority Data

Dec. 16, 2020   (CN) .......................... 202011483967.1

(51) Int. Cl.
*F16M 11/12*      (2006.01)

(52) U.S. Cl.
CPC ................................. *F16M 11/126* (2013.01)

(58) Field of Classification Search
CPC .................................................... F16M 11/126
USPC ...... 248/125.2, 125.7, 125.9, 917, 919, 920, 248/921, 922
See application file for complete search history.

(56) References Cited

U.S. PATENT DOCUMENTS

| | | | | |
|---|---|---|---|---|
| 2,779,642 A | * | 1/1957 | Matthews | A47B 11/00 |
| | | | | 384/615 |
| 5,529,265 A | * | 6/1996 | Sakurai | A47C 7/723 |
| | | | | 244/118.5 |
| 5,751,548 A | * | 5/1998 | Hall | F16C 11/10 |
| | | | | 248/122.1 |
| 5,975,472 A | | 11/1999 | Hung | |
| 7,261,265 B2 | | 8/2007 | Burns | |
| 7,296,774 B2 | | 11/2007 | Oh | |

(Continued)

FOREIGN PATENT DOCUMENTS

| | | |
|---|---|---|
| CN | 105605379 A | 5/2016 |
| CN | 105605379 B | 10/2019 |

(Continued)

OTHER PUBLICATIONS

TW Office Action dated Dec. 29, 2021 in Taiwan application No. 109146913.

(Continued)

*Primary Examiner* — Muhammad Ijaz

(74) *Attorney, Agent, or Firm* — McClure, Qualey & Rodack, LLP

(57) ABSTRACT

A biaxial pivoting mechanism configured for connecting an object to a holder includes a mount component, a rotatable connector, a main body and a mount base. The mount component is configured to be fixed to the object. The rotatable connector is rotatably disposed on the mount component about a first axis. The main body is fixed to the rotatable connector. The mount base is configured to be fixed to the holder, and the main body is rotatably disposed on the mount base about a second axis not parallel to the first axis. The main body has a first surface, a second surface, and an accommodating space. The first surface is located closer to the rotatable connector than the second surface. The accommodating space extends to the second surface from the first surface. At least part of the mount base is located in the accommodating space.

17 Claims, 15 Drawing Sheets

(56) References Cited

U.S. PATENT DOCUMENTS

| | | | |
|---|---|---|---|
| 7,510,155 B2* | 3/2009 | Huang | F16M 11/10 |
| | | | 248/278.1 |
| 9,277,812 B2 | 3/2016 | Bennett et al. | |
| 2003/0132356 A1 | 7/2003 | Copeland | |
| 2004/0000031 A1 | 1/2004 | Hsu | |
| 2013/0126685 A1* | 5/2013 | Lucas | F16M 13/02 |
| | | | 248/205.1 |

FOREIGN PATENT DOCUMENTS

| | | |
|---|---|---|
| TW | 527073 U | 4/2003 |
| TW | M529101 U | 9/2016 |

OTHER PUBLICATIONS

Indian language Examination Report dated Jun. 27, 2022, issued in application No. IN 202134026382 (with English language translation included).

* cited by examiner

## BIAXAL PIVOTING MECHANISM AND ANGLE ADJUSTMENT DEVICE

CROSS-REFERENCE TO RELATED APPLICATIONS

This non-provisional application claims priority under 35 U.S.C. § 119(a) on Patent Application No(s). 202011483967.1 filed in China, P.R.C. on Dec. 16, 2020, the entire contents of which are hereby incorporated by reference.

TECHNICAL FIELD

The present disclosure relates to a pivoting mechanism, more particularly to a biaxial pivoting mechanism and an angle adjustment device.

BACKGROUND

In order to rotate a display device in multi-directions, the display holder generally includes a base, a frame, and a biaxial pivot, where the frame is rotatably disposed on the base to enable a horizontal rotation of the display device, and the biaxial pivot is movably mounted on the frame to enable a vertical rotation and a roll rotation of the display device.

In recent years, the display devices and their holders are developed specifically to meet the increasing demand for lightweight, thin, and small designs. However, the mechanisms of the current biaxial pivots in the market are unfavorable for lightweight design. Therefore, it is desired to develop a lightweight holder for display device.

SUMMARY

The present disclosure provides a biaxial pivoting mechanism and an angle adjustment device that can enable a lightweight and small display device holder and therefore are favorable for achieving an aesthetically pleasing display device.

According to one aspect of the present disclosure, a biaxial pivoting mechanism configured for connecting an object to a holder includes a mount component, a rotatable connector, a main body, and a mount base. The mount component is configured to be fixed to the object. The rotatable connector is rotatably disposed on the mount component about a first axis. The main body is fixed to the rotatable connector. The mount base is configured to be fixed to the holder, and the main body is rotatably disposed on the mount base about a second axis not parallel to the first axis. The main body has a first surface, a second surface, and an accommodating space. The first surface is located closer to the rotatable connector than the second surface. The accommodating space extends to the second surface from the first surface. At least part of the mount base is located in the accommodating space.

According to another aspect of the present disclosure, a biaxial pivoting mechanism configured for connecting an object to a holder includes a mount component, a rotatable connector, a main body, and a mount base. The mount component is configured to be fixed to the object, and the mount component has an opening. The rotatable connector is rotatably disposed in the opening of the mount component about a first axis. The main body is fixed to the rotatable connector. The mount base is configured to be fixed to the holder, and the main body is rotatably disposed on the mount base about a second axis not parallel to the first axis. The rotatable connector has a first surface, a second surface, and an accommodating space. The first surface is opposite to the second surface. The accommodating space extends to the second surface from the first surface. At least part of the mount base is located in the accommodating space.

According to further another aspect of the present disclosure, an angle adjustment device includes a holder, an object, and a biaxial pivoting mechanism. The biaxial pivoting mechanism includes a mount component, a rotatable connector, a main body, and a mount base. The mount component is fixed to the object. The rotatable connector is rotatably disposed on the mount component about a first axis. The main body is fixed to the rotatable connector. The mount base is fixed to the holder, and the main body is rotatably disposed on the mount base about a second axis not parallel to the first axis. The main body has a first surface, a second surface, and an accommodating space. The first surface is located closer to the rotatable connector than the second surface. The accommodating space extends to the second surface from the first surface. At least part of the mount base is located in the accommodating space.

According to still further another aspect of the present disclosure, an angle adjustment device includes a holder, an object, and a biaxial pivoting mechanism. The biaxial pivoting mechanism includes a mount component, a rotatable connector, a main body, and a mount base. The mount component is fixed to the object, and the mount component has an opening. The rotatable connector is rotatably disposed in the opening of the mount component about a first axis. The main body is fixed to the rotatable connector. The mount base is fixed to the holder, and the main body is rotatably disposed on the mount base about a second axis not parallel to the first axis. The rotatable connector has a first surface, a second surface, and an accommodating space. The first surface is opposite to the second surface. The accommodating space extends to the second surface from the first surface. At least part of the mount base is located in the accommodating space.

According to the biaxial pivoting mechanism and the angle adjustment device discussed above, at least part of the mount base is located in the accommodating space and located between the first surface and the second surface, the arrangement of which significantly reduces the thickness of the biaxial pivoting mechanism. Note that the thickness refers to the thickness of the biaxial pivoting mechanism excluding the mount base.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
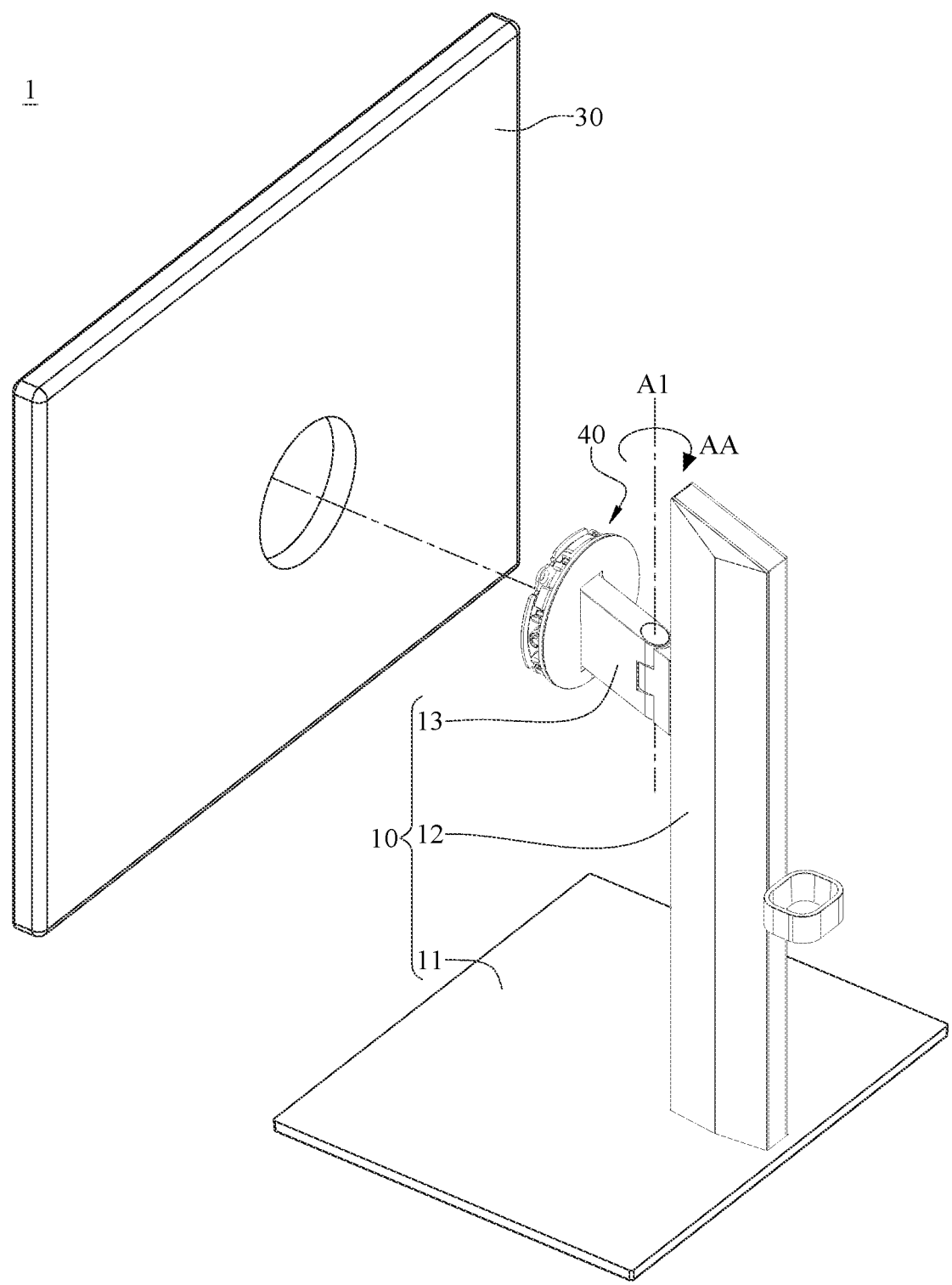
FIG. 1 is an exploded view of an angle adjustment device according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, there is shown an exploded view of an angle adjustment device according to a first embodiment of the present disclosure. This embodiment provides an angle adjustment device 1 that includes a holder 10, an object to be supported 30 (can be simply referred to as "object 30"), and a biaxial pivoting mechanism 40. In detail, the holder 10 includes a base 11, a stand 12, and a pivotable connector 13. The stand 12 stands on the base 11 and is connected to the biaxial pivoting mechanism 40 via the pivotable connector 13. The pivotable connector 13 is pivotably connected to the stand 12 about a reference axis A1, such that the object 30 is pivotably connected to the stand 12 about the reference axis A1. That is, the pivotable connector 13 enables a horizontal rotation of the object 30 (as indicated by the direction of arrow AA). The biaxial pivoting mechanism 40 is connected to and located between the pivotable connector 13 and the object 30 so as to enable a vertical rotation and a roll rotation of the object 30 with respect to the pivotable connector 13. In this embodiment, the object 30 is, for example, a display device, but the present disclosure is not limited thereto. In some embodiments, the object may be a camera.

Figure 2:
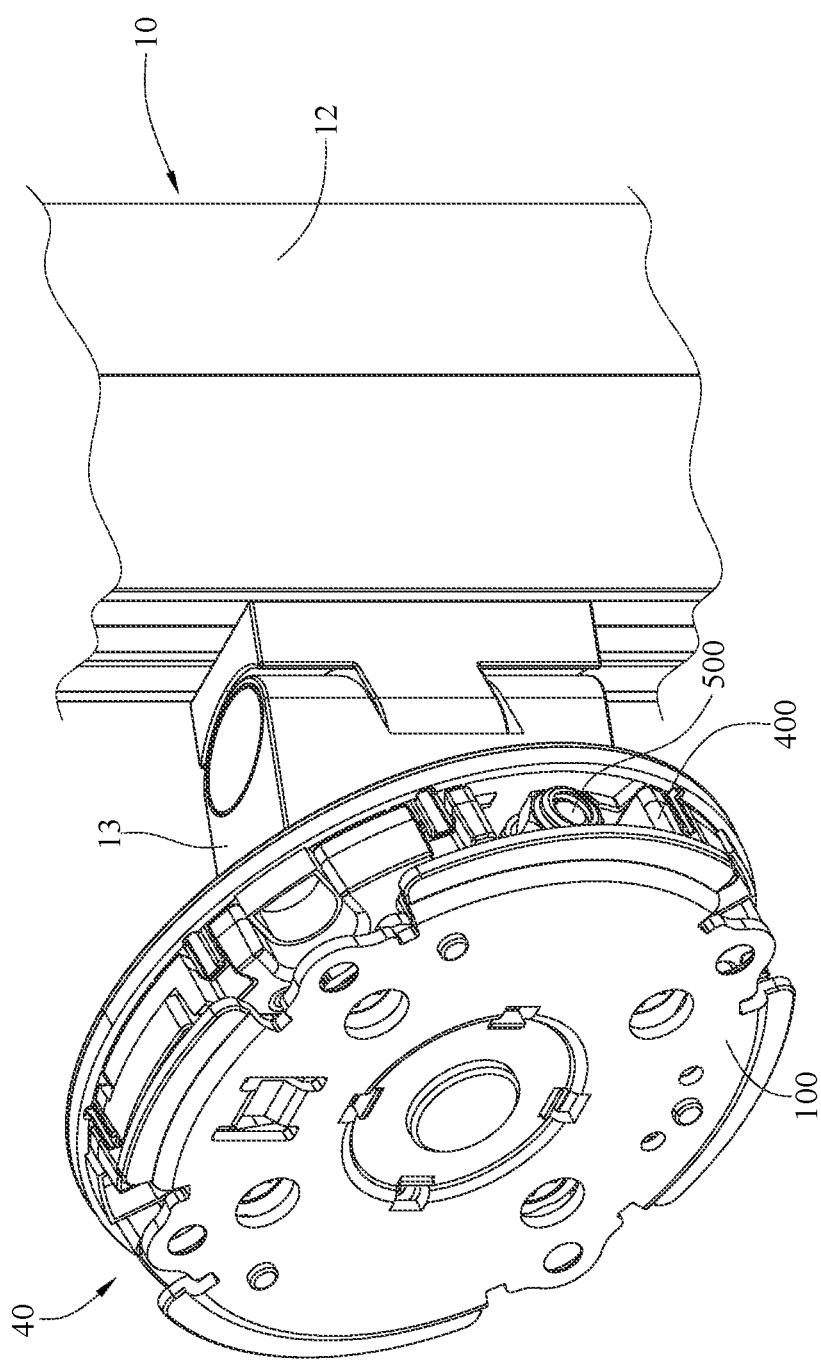
FIG. 2 is a partial and enlarged view of a biaxial pivoting mechanism and a stand of the angle adjustment device in FIG. 1 viewing from another perspective.
Figure 3:
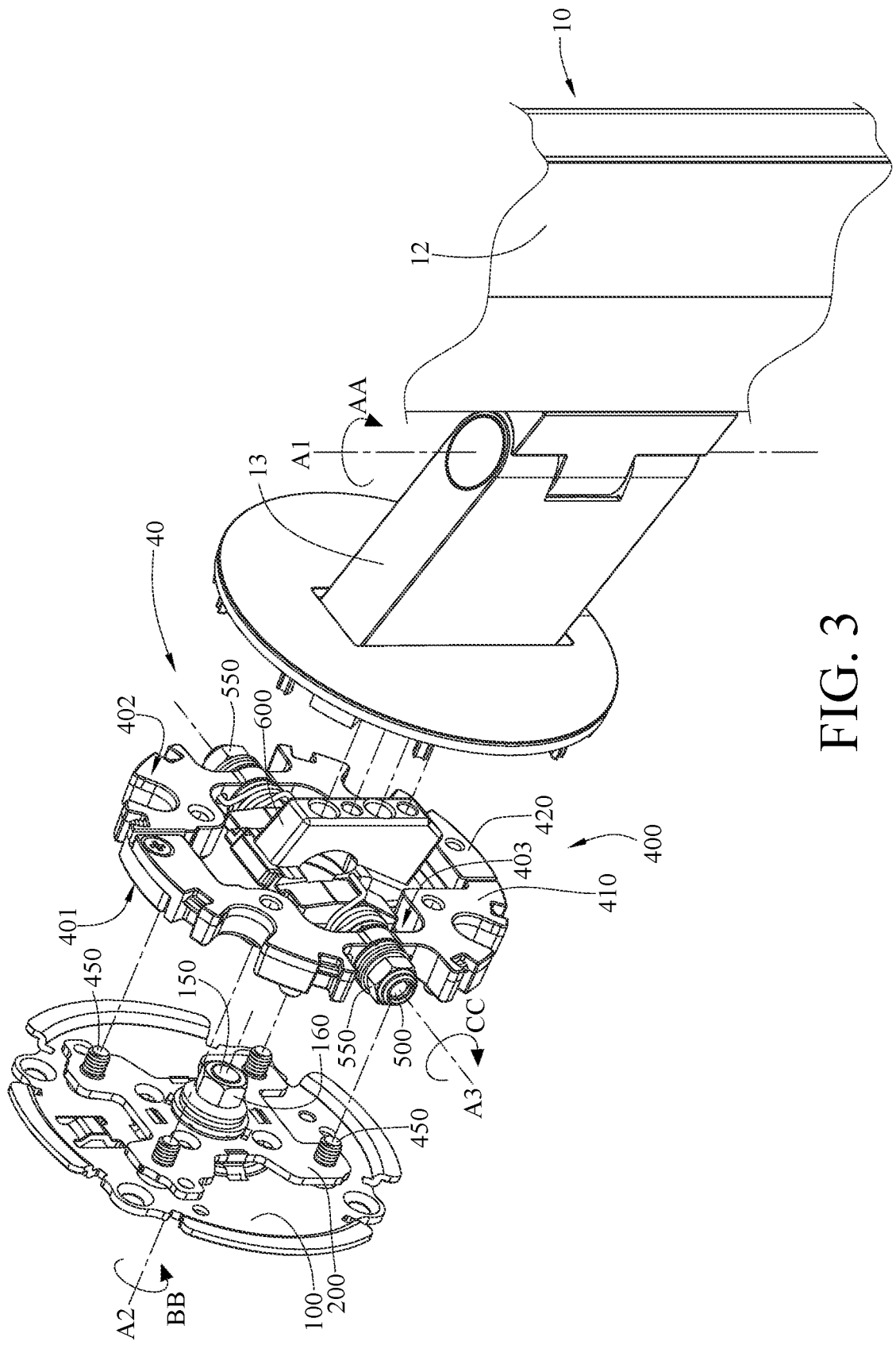
FIG. 3 is a partial and exploded view of the biaxial pivoting mechanism of the angle adjustment device in FIG. 1.
Figure 4:
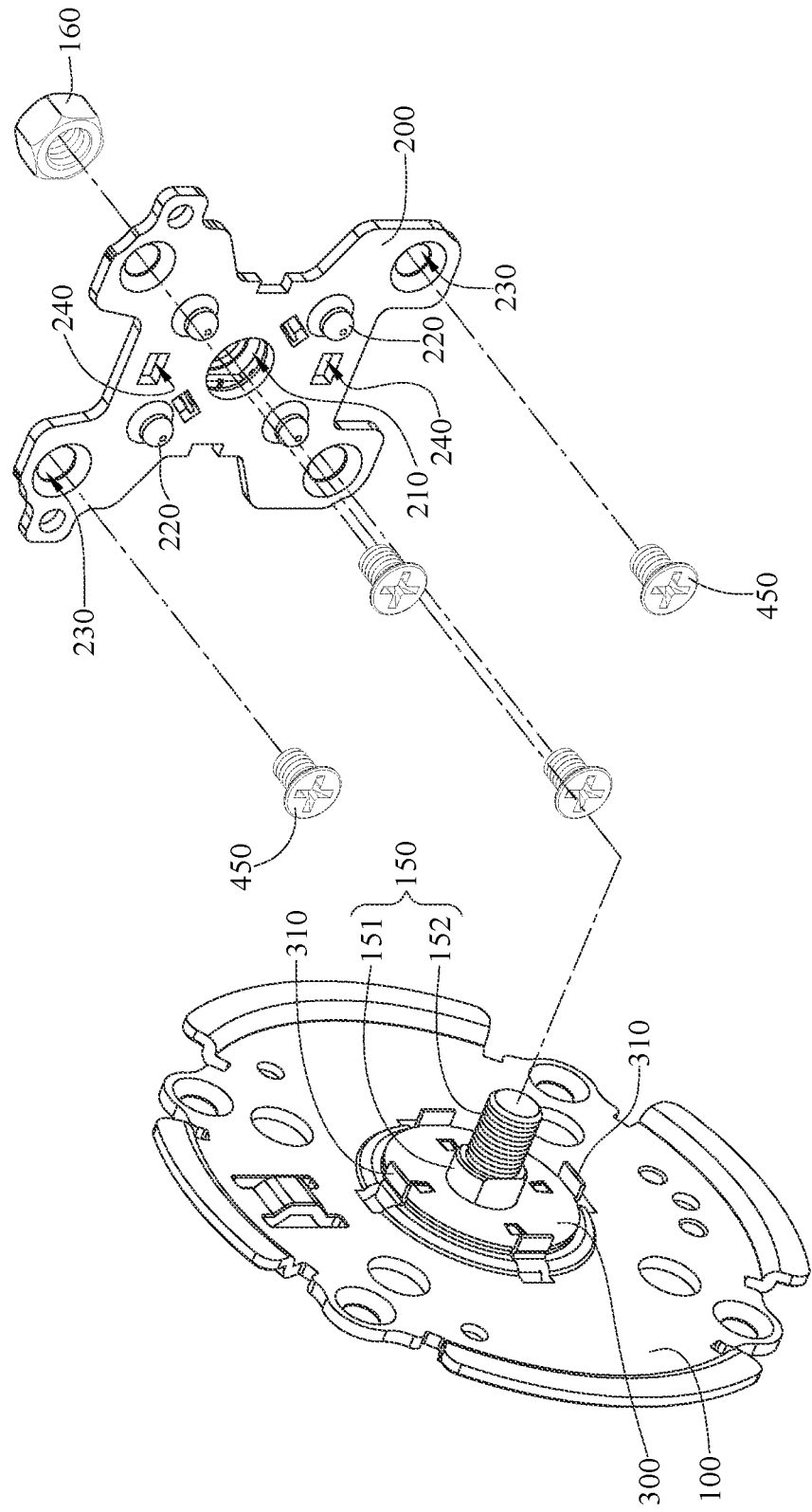
FIG. 4 is an exploded view of a mount component and a rotatable connector of the biaxial pivoting mechanism in FIG. 3.
Figure 5:
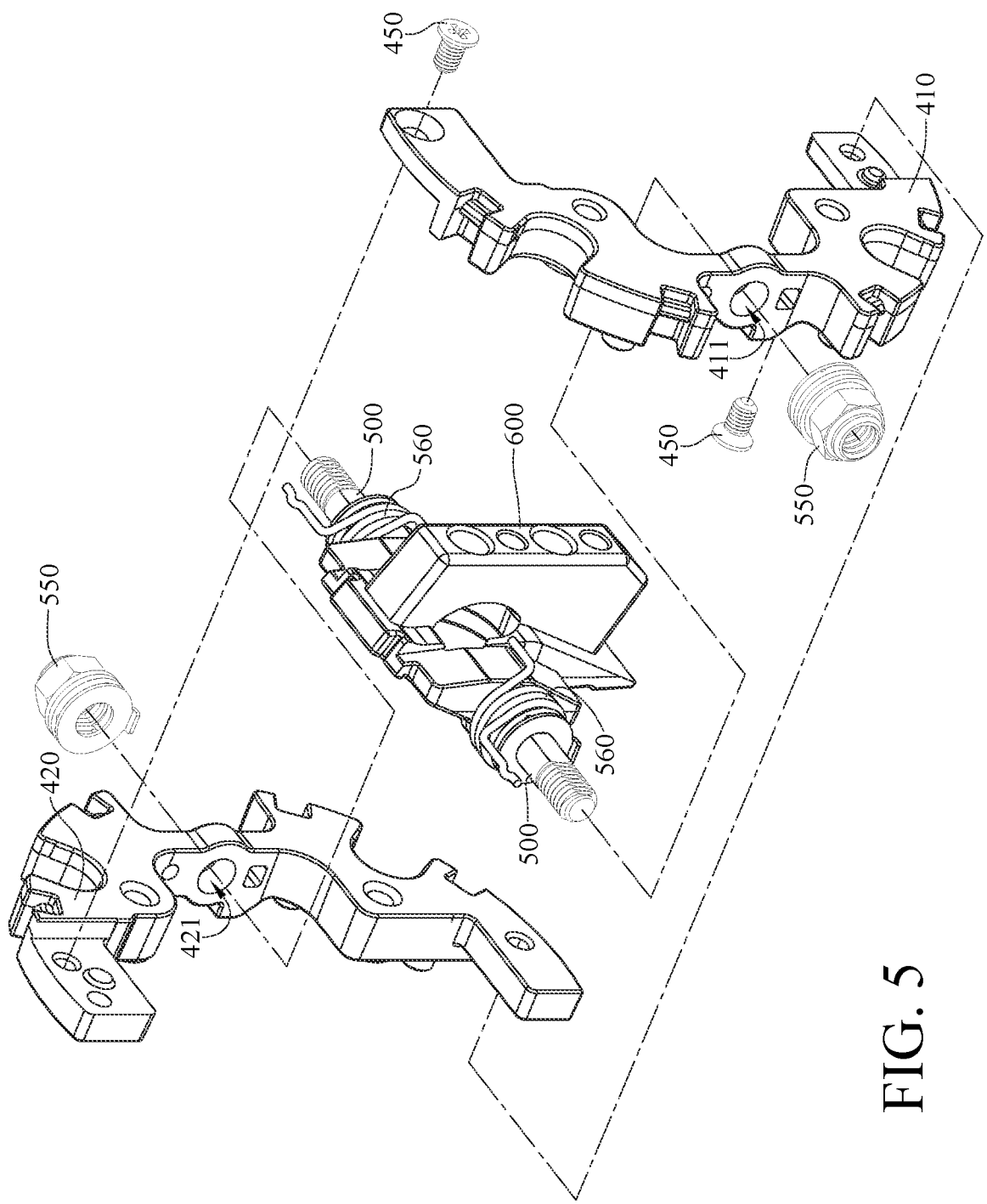
FIG. 5 is an exploded view of a main body and a mount base of the biaxial pivoting mechanism in FIG. 3.

Please further refer to FIG. 2 to FIG. 5, where FIG. 2 is a partial and enlarged view of a biaxial pivoting mechanism and a stand of the angle adjustment device in FIG. 1 viewing from another perspective, FIG. 3 is a partial and exploded view of the biaxial pivoting mechanism of the angle adjustment device in FIG. 1, FIG. 4 is an exploded view of a mount component and a rotatable connector of the biaxial pivoting mechanism in FIG. 3, and FIG. 5 is an exploded view of a main body and a mount base of the biaxial pivoting mechanism in FIG. 3.

The biaxial pivoting mechanism 40 includes a mount component 100, a rotatable connector 200, a main body 400, and a mount base 600. As shown in FIG. 1 and FIG. 2, the mount component 100 is mounted to the back side of the object 30 via, for example, one or more screws, but the present disclosure is not limited thereto. In some other embodiments, the mount component may be mounted to the object in a quick connection manner such as snap-fit.

As shown in FIG. 3 and FIG. 4, the rotatable connector 200 is rotatably disposed on the mount component 100 about a first axis A2 that is perpendicular to the reference axis A1 so as to enable a roll rotation of the object 30 with respect to the pivotable connector 13 (as indicated by the direction of arrow BB). In this embodiment, the biaxial pivoting mechanism 40 may further include a first pivot 150 and a first fastener 160. The first pivot 150 is fixed to the mount component 100 and disposed through the rotatable connector 200. The first pivot 150 includes a root portion 151 fixed on the mount component 100 and a post portion 152 protruding outwards from the root portion 151. The root portion 151 has a non-circular cross section, and the post portion 152 has a substantially circular cross section. The mount component 100 may have a mating hole (not shown) for receiving the root portion 151 so that the root portion 151 is not allowed to rotate with respect to the mount component 100. The rotatable connector 200 is rotatably disposed around the root portion 151. In specific, the post portion 152 has outer threads, the post portion 152 can be inserted into a circular opening 210 of the rotatable connector 200 so that the first fastener 160, such as a nut, can be threaded onto the post portion 152 to clamp the rotatable connector 200 between the first fastener 160 and the root portion 151, but the circular opening 210 is slightly larger than the root portion 151 so that the rotation motion of the rotatable connector 200 with respect to the first pivot 150 does not have physical interference with the root portion 151.

In this embodiment, the biaxial pivoting mechanism 40 may further include a spacer 300 having a smaller area than that of the mount component 100. The spacer 300 is rotatably stacked on the mount component 100 and located between the mount component 100 and the rotatable connector 200 so as to separate the rotatable connector 200 from the mount component 100. The spacer 300 includes a plurality of positioning bent tabs 310 extending towards the rotatable connector 200. The rotatable connector 200 has a plurality of positioning holes 240. The positioning bent tabs 310 can be inserted into the positioning holes 240 so as to secure the position of the rotatable connector 200 with respect to the first pivot 150. As a result, the rotatable connector 200 is in not direct contact with the mount component 100 and can be stably rotating about the first axis A2. It is noted that the spacer is optional, the biaxial pivoting mechanism in some other embodiments may omit the space to let the rotatable connector to directly contact the mount component.

In this embodiment, the rotatable connector 200 may include a plurality of bump structures 220 protruding outwards from a side thereof facing towards the mount component 100. The rotatable connector 200 touches the mount component 100 with its bump structures 220. As a result, the stability of the rotation motion of the rotatable connector 200 is improved but the friction between the rotatable connector 200 and the mount component 100 is still small due to small contact areas.

The rotatable connector 200 may further have a plurality of through holes 230. The biaxial pivoting mechanism 40 may further include a plurality of screws 450. The screws 450 are disposed through the through holes 230 and screwed into the main body 400, such that the rotatable connector 200 is fixed onto the main body 400.

In this embodiment, the quantities of the bump structures 220 and the through holes 230 are exemplary and are not intended to limit the present disclosure. In some other embodiments, the rotatable connector may include one bump structure or one through hole.

As shown in FIG. 3, the main body 400 has a first surface 401, a second surface 402, and an accommodating space 403. The first surface 401 and the second surface 402 are arranged along, for example, the first axis A2, and the first surface 401 is located closer to the rotatable connector 200 than the second surface 402. The accommodating space 403 extends to the second surface 402 from the first surface 401.

The main body 400 is rotatably disposed on the mount base 600 about a second axis A3 that is perpendicular to the reference axis A1 and the first axis A2, and the mount base 600 is configured to be mounted to the pivotable connector 13, the configuration of which enables a vertical rotation of the object 30 with respect to the pivotable connector 13 (as indicated by the direction of arrow CC). As shown in FIG. 3 and FIG. 5, in this embodiment, the biaxial pivoting mechanism 40 may further include a second pivot 500 and two second fasteners 550. The main body 400 includes two assembly pieces 410 and 420. The assembly pieces 410 and 420 are assembled together to form the accommodating space 403 therebetween. The assembly piece 410 has a pivoting hole 411, and the assembly piece 420 has a pivoting hole 421. The pivoting holes 411 and 421 are respectively located at two opposite sides of the accommodating space 403. The second pivot 500 is disposed through the pivoting holes 411 and 421 so that the second fasteners 550, such as nuts, can be respectively threaded onto two opposite ends of the second pivot 500. The mount base 600 is fixed to the second pivot 500. In such a configuration, the main body 400 is rotatable with respect to the second pivot 500 and the mount base 600 about the second axis A3.

It is noted that dividing the main body 400 into the two pieces (i.e., the assembly pieces 410 and 420) can facilitate the installation of the main body 400 onto the second pivot 500, but the present disclosure is not limited thereto. In some other embodiments, the main body may be manufactured in a single piece.

In this embodiment, the biaxial pivoting mechanism 40 may further include two elastic components 560 disposed on the second pivot 500. One end of each elastic component 560 is fixed to the mount base 600, and the other end of each elastic component 560 is fixed to the main body 400, such that the elastic components 560 can provide elastic force assisting in moving the biaxial pivoting mechanism 40.

In this embodiment, the quantity of the elastic components 560 is exemplary and is not intended to limit the present disclosure. In some other embodiments, the biaxial pivoting mechanism may include one elastic component.

Figure 6:
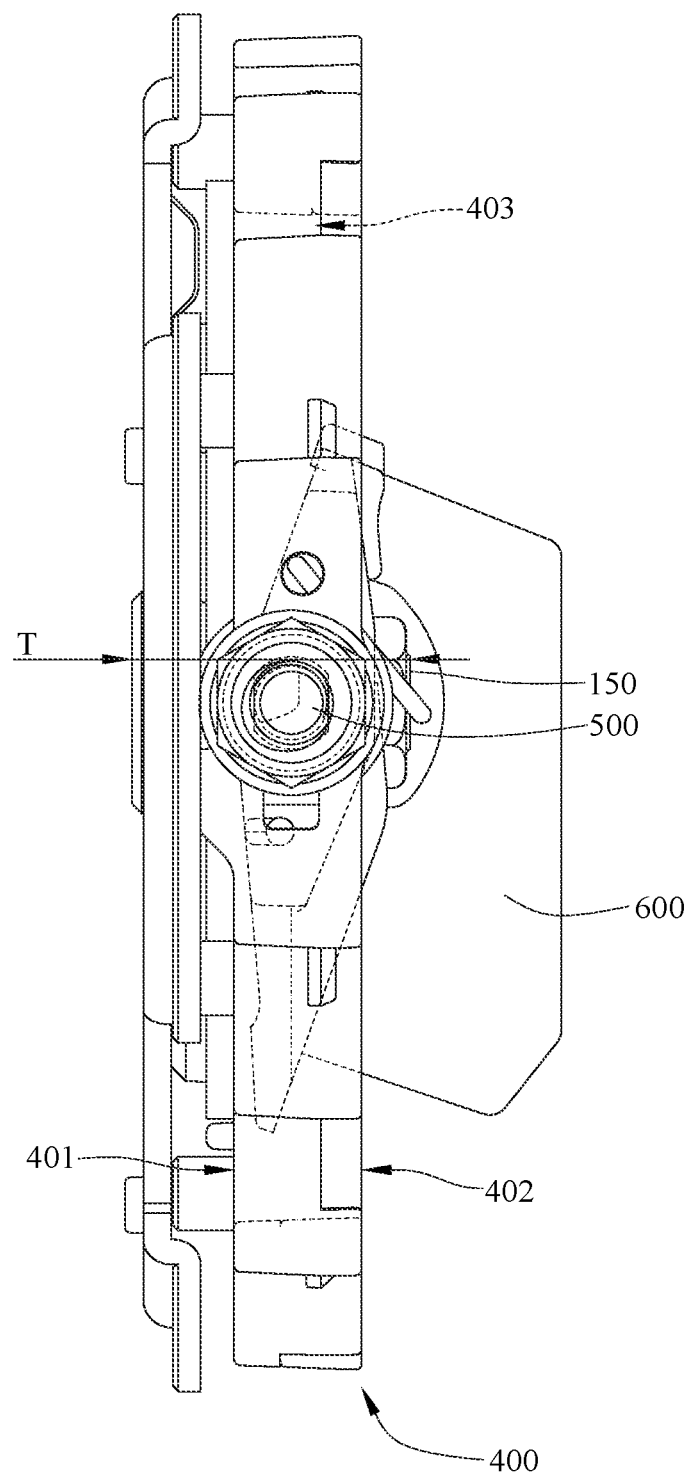
FIG. 6 is a side view of the biaxial pivoting mechanism in FIG. 2.

Please refer to FIG. 6, there is shown a side view of the biaxial pivoting mechanism in FIG. 2. As shown, in this embodiment, the mount base 600 and the second pivot 500 are partially located in the accommodating space 403 and located between the first surface 401 and the second surface 402, the arrangement of which significantly reduces the thickness of the biaxial pivoting mechanism 40. In specific, in FIG. 6, the general thickness T of the biaxial pivoting mechanism 40 is approximately as small as the length of the first pivot 150. Note that the thickness T refers to the thickness of the biaxial pivoting mechanism 40 measured along the first axis A2 excluding the mount base 600.

In this embodiment, the mount base 600 and the second pivot 500 of the biaxial pivoting mechanism 40 are partially located in the accommodating space 403, but the present disclosure is not limited thereto. For example, in the biaxial pivoting mechanism of some other embodiments, not both of or only one of the mount base and the second pivot is partially located in the accommodating space.

Figure 7:
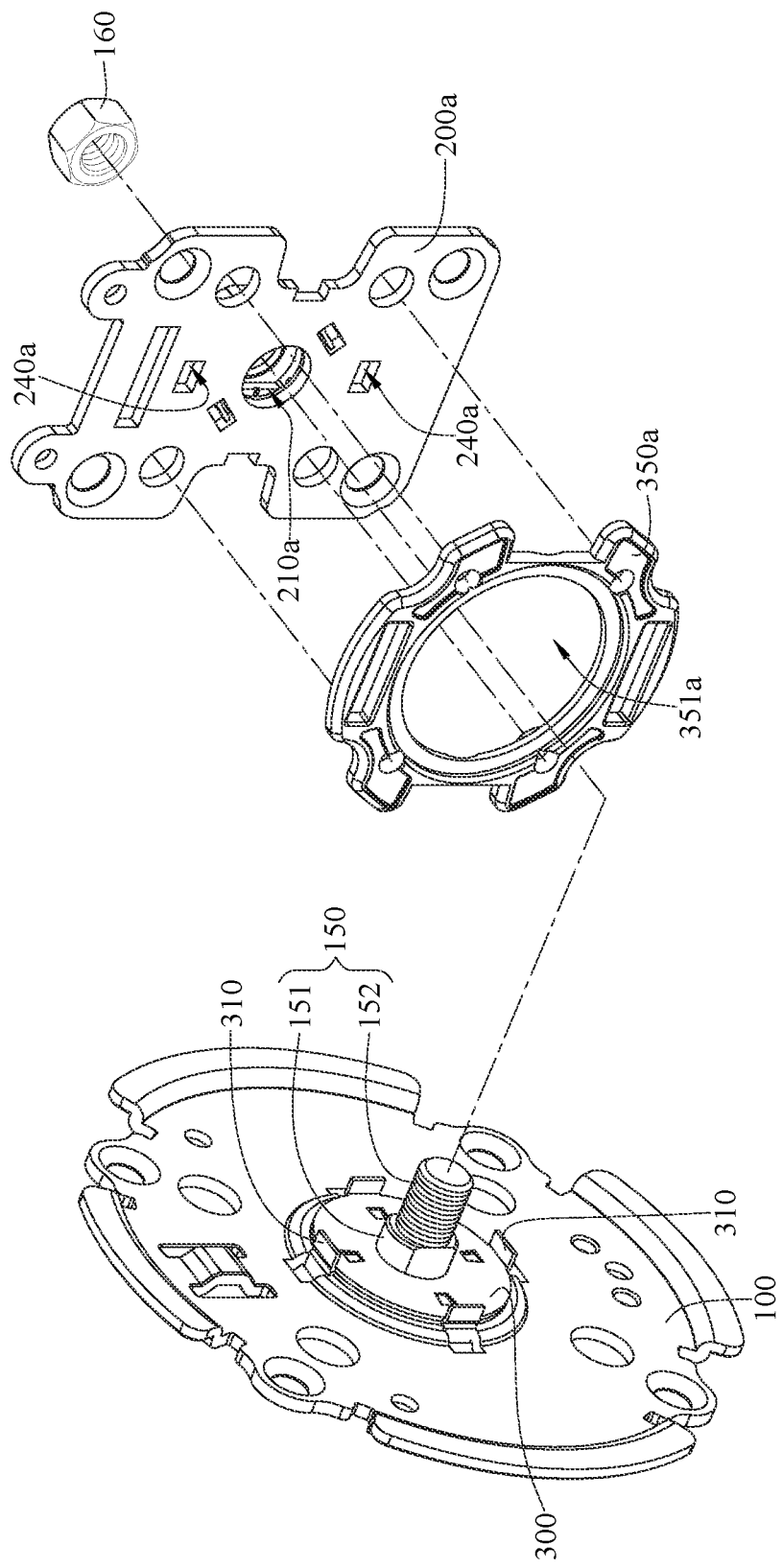
FIG. 7 is an exploded view of a mount component, a rotatable connector and a wear pad of a biaxial pivoting mechanism according to a second embodiment of the present disclosure.

Please refer to FIG. 7, there is shown an exploded view of a mount component, a rotatable connector and a wear pad of a biaxial pivoting mechanism according to a second embodiment of the present disclosure. In this and some embodiments, the biaxial pivoting mechanism may further include a wear pad 350a. The wear pad 350a has a through hole 351a. The spacer 300 and a part of the first pivot 150 are located in the through hole 351a, such that the spacer 300 and the part of the first pivot 150 is surrounded by the wear pad 350a. The wear pad 350a is clamped between the mount component 100 and the rotatable connector 200a. The structure of and the connection between the first pivot 150, the positioning bent tabs 310 of the spacer 300, the circular opening 210a of the rotatable connector 200a, and the positioning holes 240a are similar to that of the abovementioned embodiment, and a description in this regard would not be provided again. Further, the wear resistance of the wear pad 350a is greater than the wear resistance of the mount component 100. As such, during the rotation motion of the rotatable connector 200a with respect to the mount component 100, the rotatable connector 200a mainly touches on the wear pad 350a rather than the mount component 100, thereby increasing the life span of the biaxial pivoting mechanism.

Figure 8:
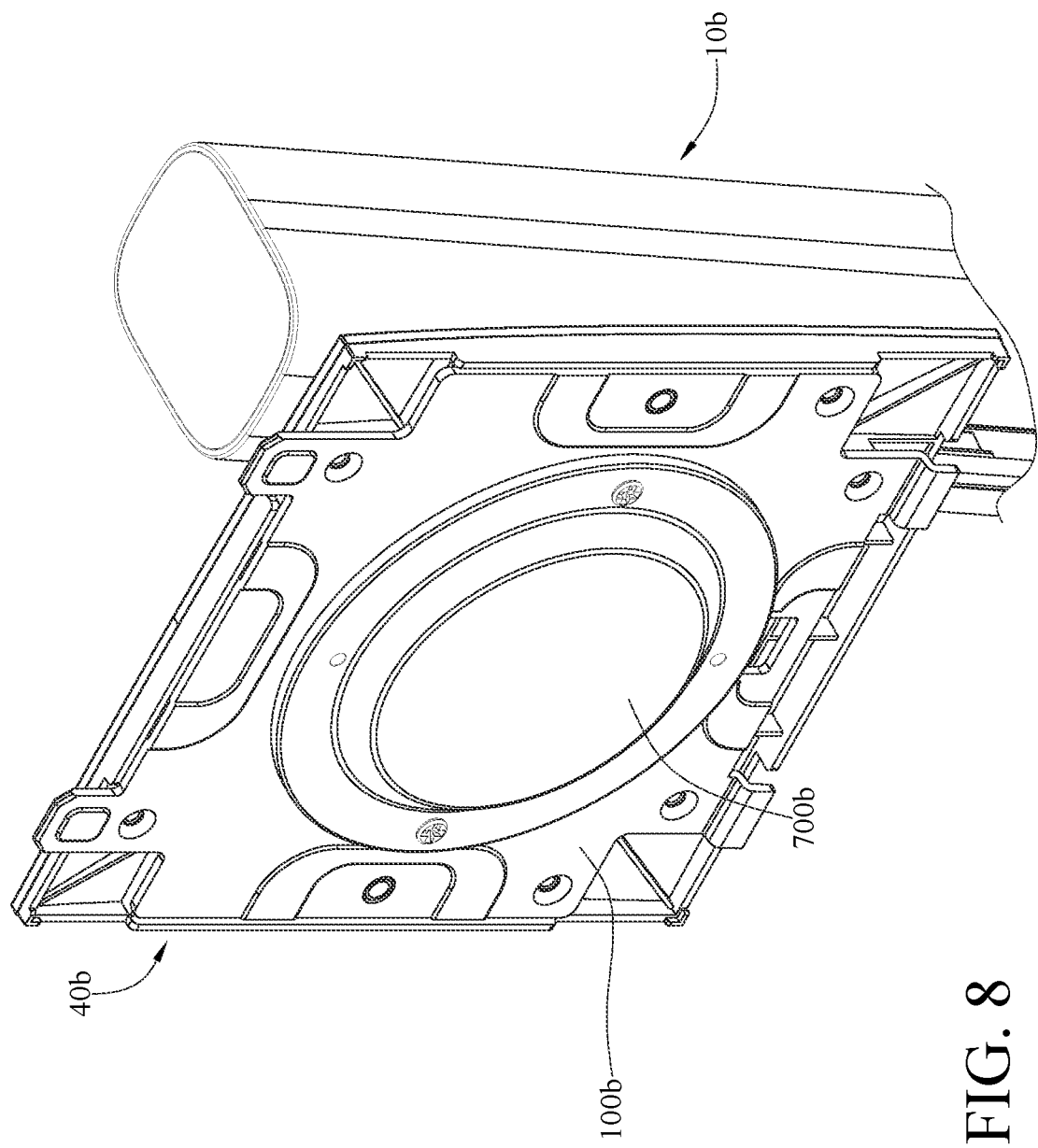
FIG. 8 is a partial and perspective view of a holder and a biaxial pivoting mechanism of an angle adjustment device according to a third embodiment of the present disclosure.
Figure 9:
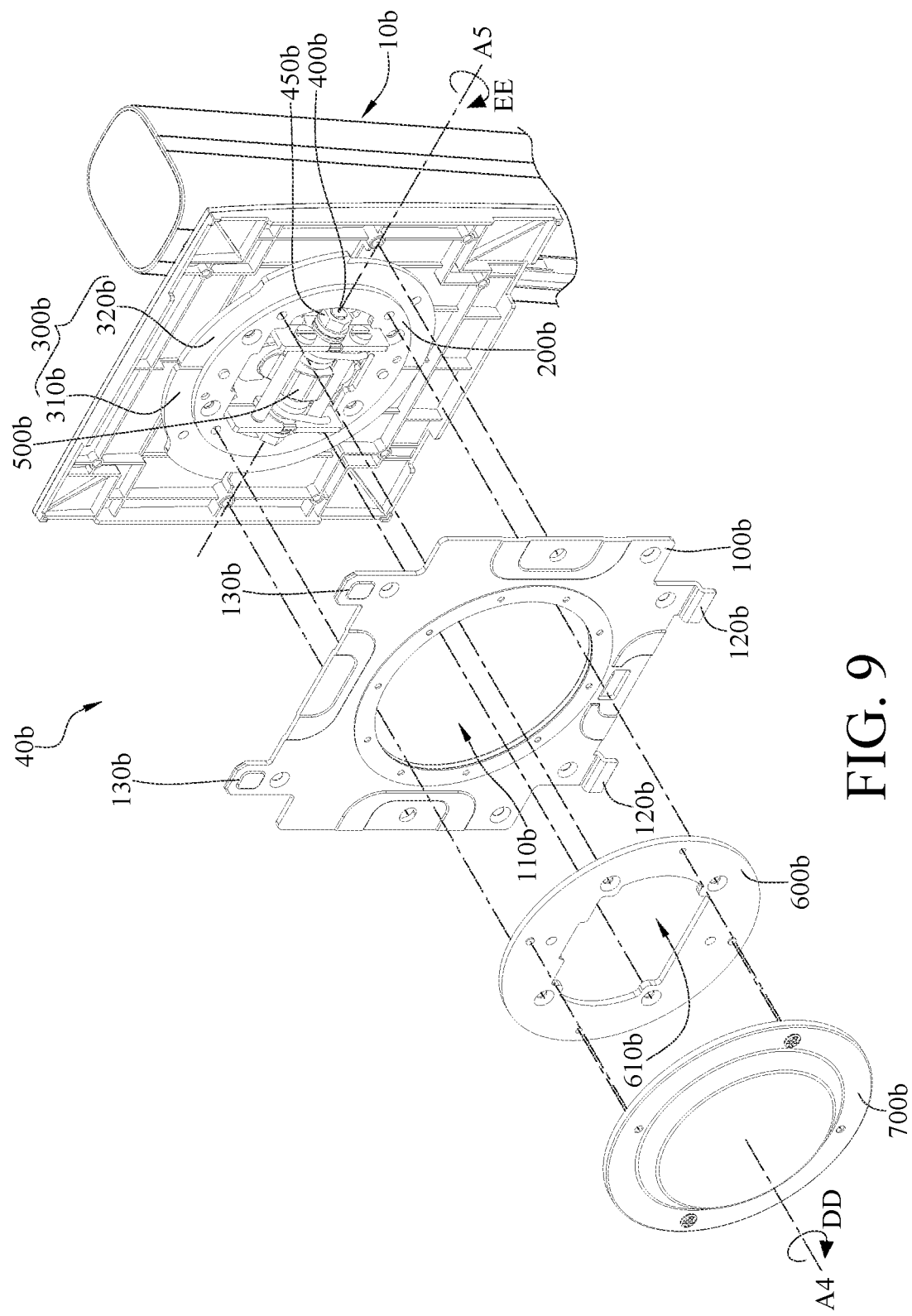
FIG. 9 is an exploded view of the biaxial pivoting mechanism in FIG. 8.
Figure 10:
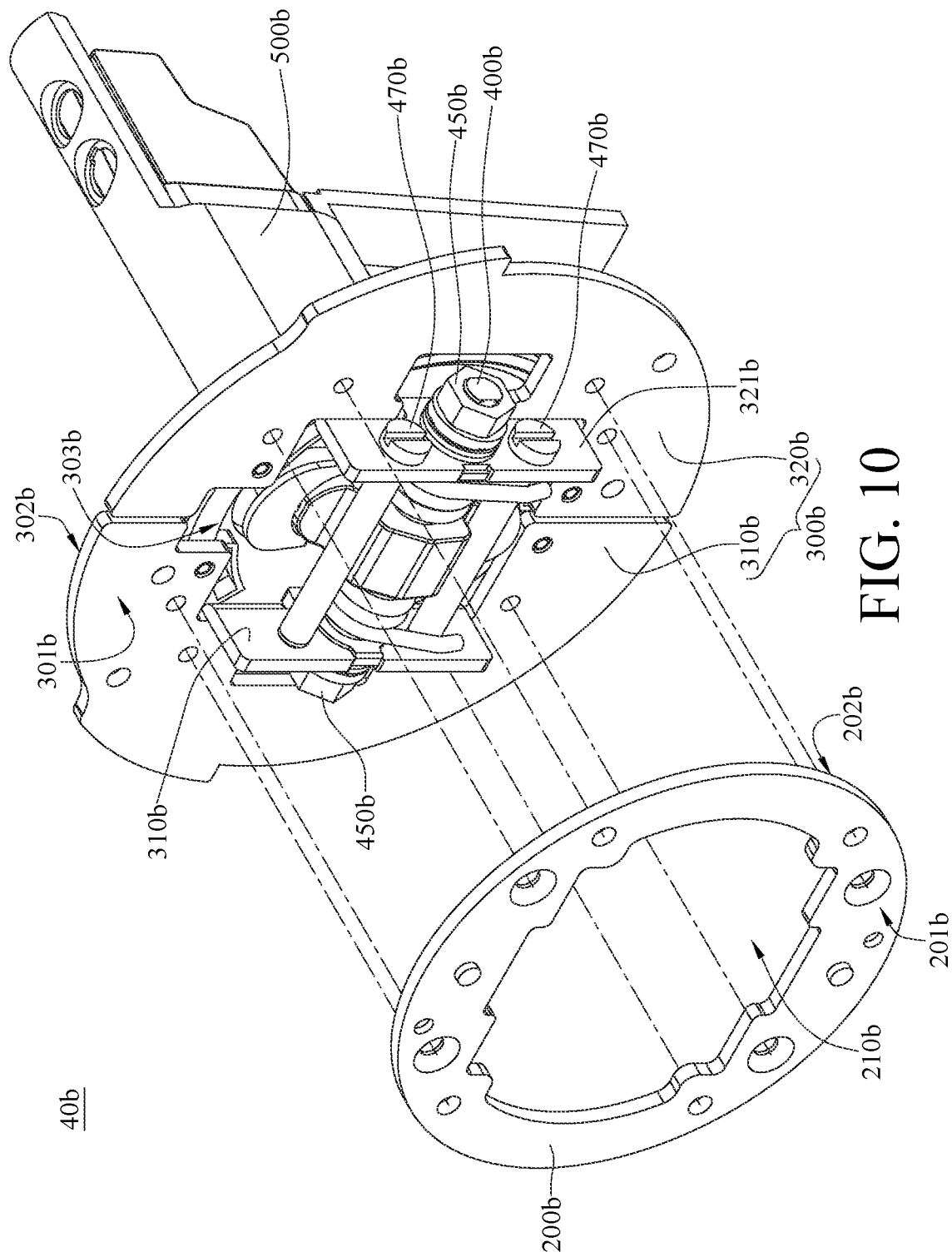
FIG. 10 is an exploded view of a rotatable connector and a main body of the biaxial pivoting mechanism in FIG. 9.
Figure 11:
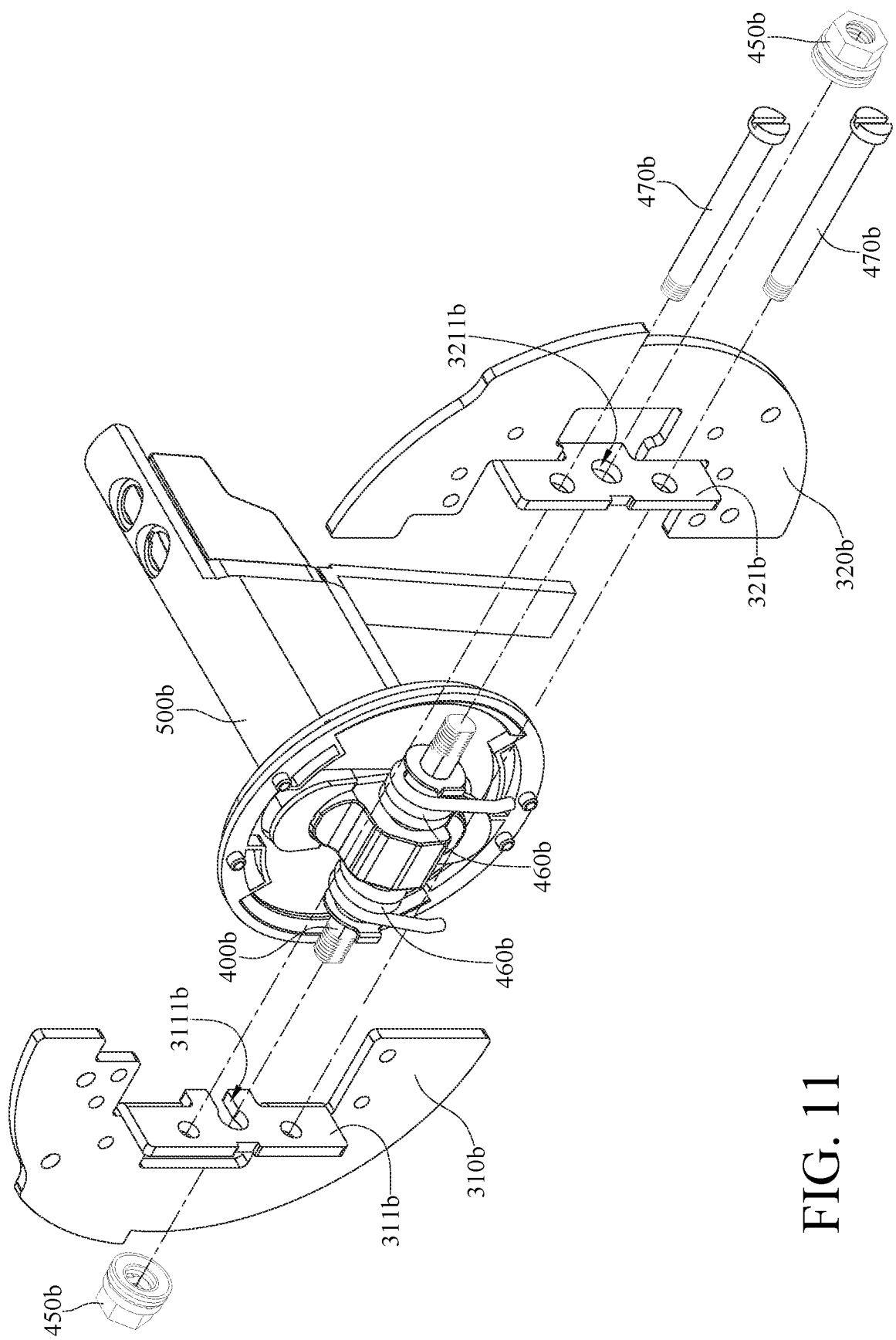
FIG. 11 is an exploded view of the main body in FIG. 10.
Figure 12:
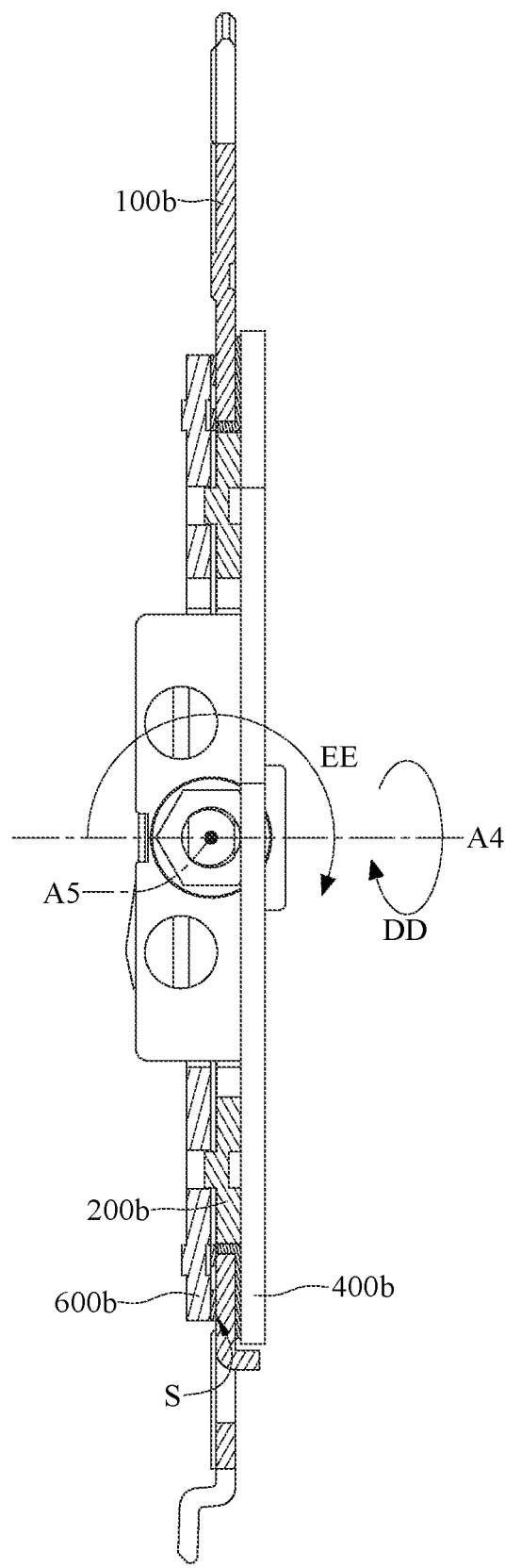
FIG. 12 is a partially cross-sectioned view of the biaxial pivoting mechanism in FIG. 8.
Figure 13:
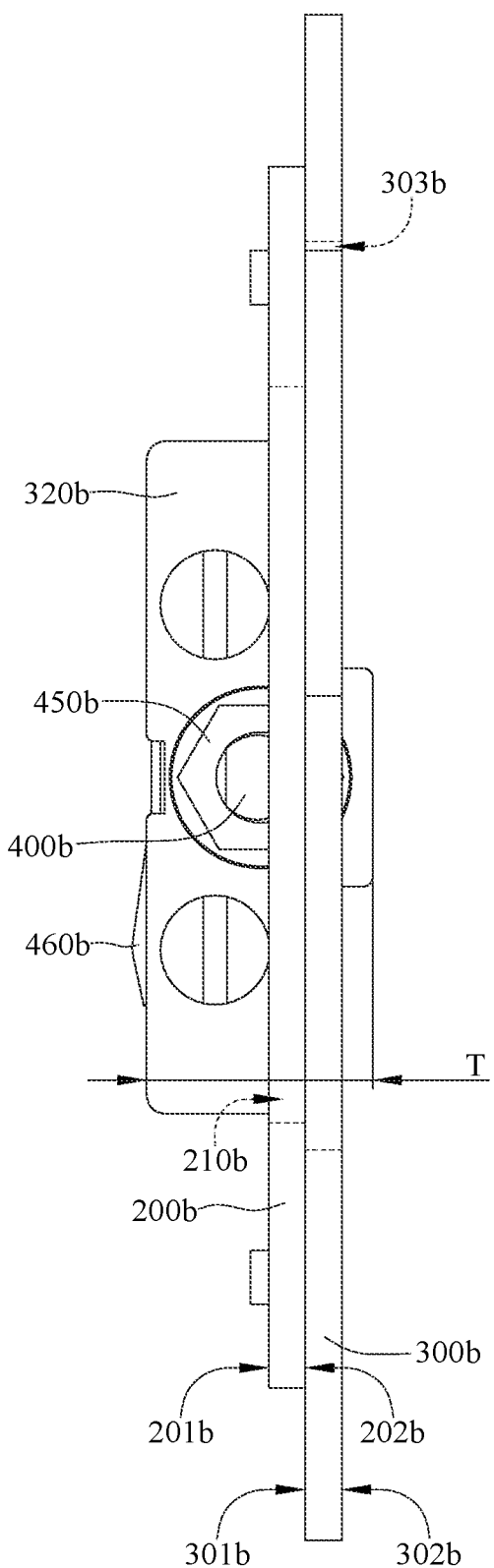
FIG. 13 is a partial side view of the biaxial pivoting mechanism in FIG. 8.

Please refer to FIG. 8 to FIG. 13, where FIG. 8 is a partial and perspective view of a holder and a biaxial pivoting mechanism of an angle adjustment device according to a third embodiment of the present disclosure, FIG. 9 is an exploded view of the biaxial pivoting mechanism in FIG. 8, FIG. 10 is an exploded view of a rotatable connector and a main body of the biaxial pivoting mechanism in FIG. 9, FIG. 11 is an exploded view of the main body in FIG. 10, FIG. 12 is a partially cross-sectioned view of the biaxial pivoting mechanism in FIG. 8, and FIG. 13 is a partial side view of the biaxial pivoting mechanism in FIG. 8.

As shown in FIG. 8 and FIG. 9, a biaxial pivoting mechanism 40b includes a mount component 100b, a rotatable connector 200b, a main body 300b, and a mount base 500b. The mount component 100b is configured to be mounted to the back side of the object 30 (shown in FIG. 1), for example, in a quick connection manner such as snap-fit, but the present disclosure is not limited thereto. In some other embodiments, the mount component may be mounted to the back side of the object via one or more screws.

The mount component 100b has an opening 110b. The rotatable connector 200b is rotatably disposed in the opening 110b of the mount component 100b about a first axis A4 so as to enable a roll rotation of the object 30 with respect to the mount base 500b (as indicated by the direction of arrow DD). The rotatable connector 200b has a first surface 201b, a second surface 202b, and an accommodating space 210b. The first surface 201b is opposite to the second surface 202b. The accommodating space 210b extends to the second surface 202b from the first surface 201b.

As shown in FIG. 10 and FIG. 11, the main body 300b is fixed to the rotatable connector 200b. The main body 300b has a first surface 301b, a second surface 302b, and an accommodating space 303b. The second surface 302b is opposite to the first surface 301b. The accommodating space 303b extends to the second surface 302b from the first surface 301b. The main body 300b includes two assembly pieces 310b and 320b and two side plates 311b and 321b. The assembly pieces 310b and 320b are assembled together to form the accommodating space 303b of the main body 300b therebetween. The side plates 311b and 321b are respectively connected to the assembly pieces 310b and 320b and located at two opposite sides of the accommodating space 303b. The side plate 311b has a pivoting hole 3111b, and the side plate 321b has a pivoting hole 3211b.

In this embodiment, the side plates 311b and 321b of the main body 300b are formed by a stamping process. That is, the main body 300b is manufactured in a single piece. However, the present disclosure is not limited thereto. In some other embodiments, the side plates and the assembly pieces may be assembled from different parts.

The main body 300b is rotatably disposed on the mount base 500b about a second axis A5 that is not in parallel with the first axis A4, and the mount base 500b is configured to be mounted to the holder 10b (shown in FIG. 8), the configuration of which enables a vertical rotation of the object 30 with respect to the holder 10b (as indicated by the direction of arrow EE). In this embodiment, the biaxial pivoting mechanism 40b may further include a pivot 400b and two fasteners 450b. The pivot 400b is disposed through the pivoting holes 3111b and 3211b so that the fasteners 450b, such as nuts, can be respectively threaded onto two opposite ends of the pivot 400b. The mount base 500b is fixed to the pivot 400b. In such a configuration, the main body 300b is rotatable with respect to the pivot 400b and the mount base 500b about the second axis A5. The pivot 400b and the mount base 500b are partially located in the accommodating space 210b of the rotatable connector 200b and the accommodating space 303b of the main body 300b and located between the first surface 201b and the second surface 202b of the rotatable connector 200b and between the first surface 301b and the second surface 302b of the main body 300b.

In this embodiment, the pivot 400b and the mount base 500b are partially located in the accommodating space 210b of the rotatable connector 200b and the accommodating space 303b of the main body 300b, but the present disclosure is not limited thereto. For example, in some other embodiments, not both of or only one of the mount base and the pivot is partially located in the accommodating spaces.

It is noted that dividing the main body 300b into the two pieces (i.e., the assembly pieces 310b and 320b) can facilitate the installation of the main body 300b onto the pivot 400b, but the present disclosure is not limited thereto. In some other embodiments, the main body may be manufactured in a single piece, and it would be described later.

In this embodiment, the biaxial pivoting mechanism 40b may further include two elastic components 460b disposed on the pivot 400b. One end of each elastic component 460b is fixed on the mount base 500b, and the other end of each elastic component 460b is fixed on the main body 300b, such that the elastic components 460b can provide elastic force assisting in moving the biaxial pivoting mechanism 40b.

In this embodiment, the quantity of the elastic components 460b is exemplary and is not intended to limit the present disclosure. In some other embodiments, the biaxial pivoting mechanism may include one elastic component.

In this embodiment, the biaxial pivoting mechanism 40b may further include two reinforcement rods 470b that are disposed through the side plates 311b and 321b of the main body 300b and located at two opposite sides of the pivot 400b so as to reinforce the structural strength of the side plates 311b and 321b, thereby preventing deformation of the side plates 311b and 321b.

As shown in FIG. 9 and FIG. 12, in this embodiment, the biaxial pivoting mechanism 40b may further include a positioning plate 600b mounted on the rotatable connector 200b. The rotatable connector 200b has a smaller area than that of the positioning plate 600b and the main body 300b, and the positioning plate 600b, the rotatable connector 200b, and the main body 300b together form an annular accommodation space S between the positioning plate 600b and the main body 300b. A portion of the mount component 100b surrounding to the opening 110b is located in the annular accommodating space S. In such a configuration, the mount component 100b is rotatable with respect to the rotatable connector 200b and the main body 300b.

As shown in FIG. 8 and FIG. 9, in this embodiment, the biaxial pivoting mechanism 40b may further include a cover 700b that is mounted on a side of the positioning plate 600b located away from the rotatable connector 200b so as to cover the positioning plate 600b.

As shown in FIG. 13, in this embodiment, the mount base 500b and the pivot 400b are partially located in the accommodating space 303b of the main body 300b and the accommodating space 210b of the rotatable connector 200b and located between the first surface 301b and the second surface 302b of the main body 300b and between the first surface 201b and the second surface 202 of the rotatable connector 200b, the arrangement of which significantly reduces the thickness of the biaxial pivoting mechanism 40b. In specific, in FIG. 13, the general thickness T of the biaxial pivoting mechanism 40b is approximately as small as the thickness of the main body 300b. Note that the thickness T refers to the thickness of the biaxial pivoting mechanism 40b excluding the mount base 500b.

Figure 14:
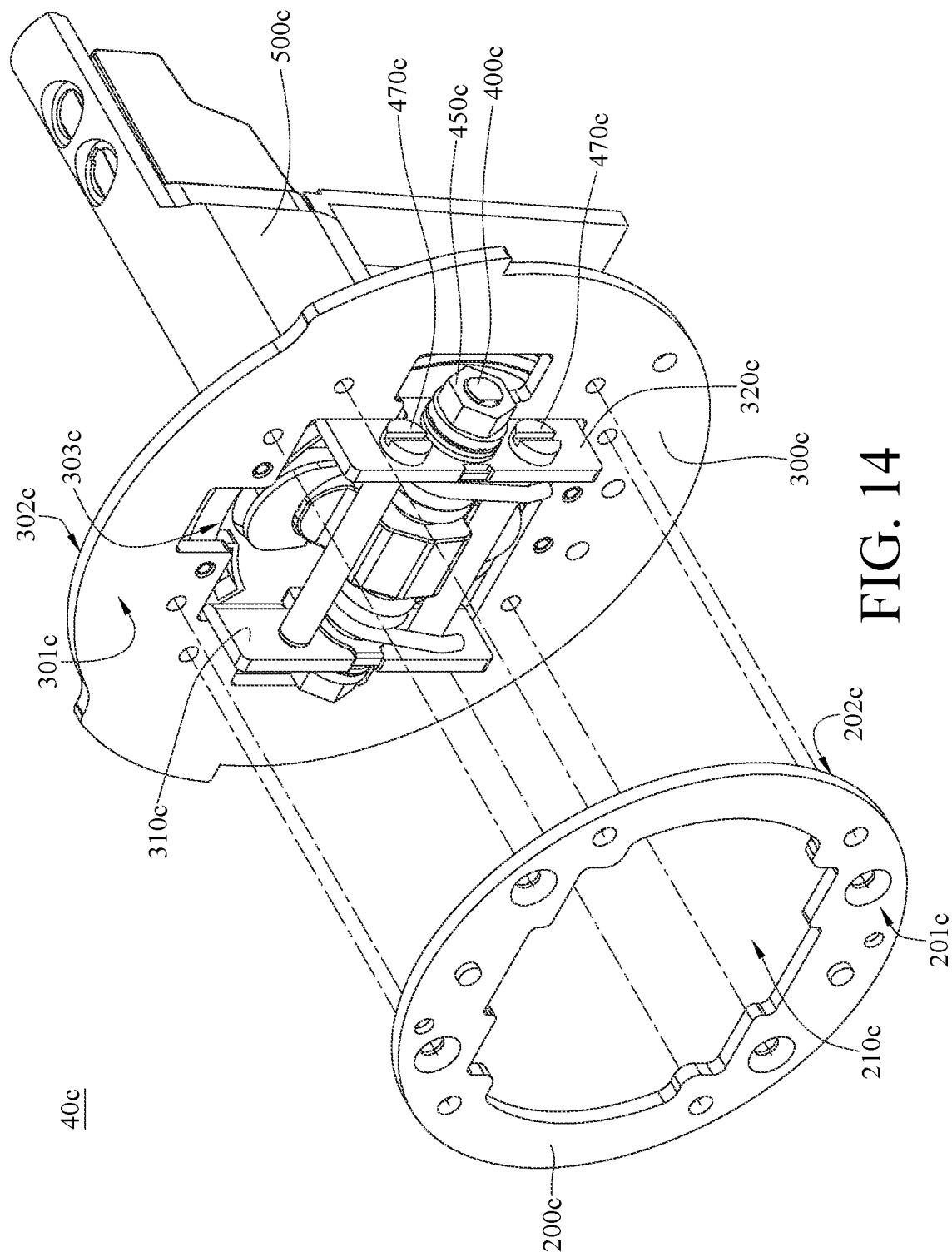
FIG. 14 is a partial and exploded view of a holder and a biaxial pivoting mechanism of an angle adjustment device according to a fourth embodiment of the present disclosure.
Figure 15:
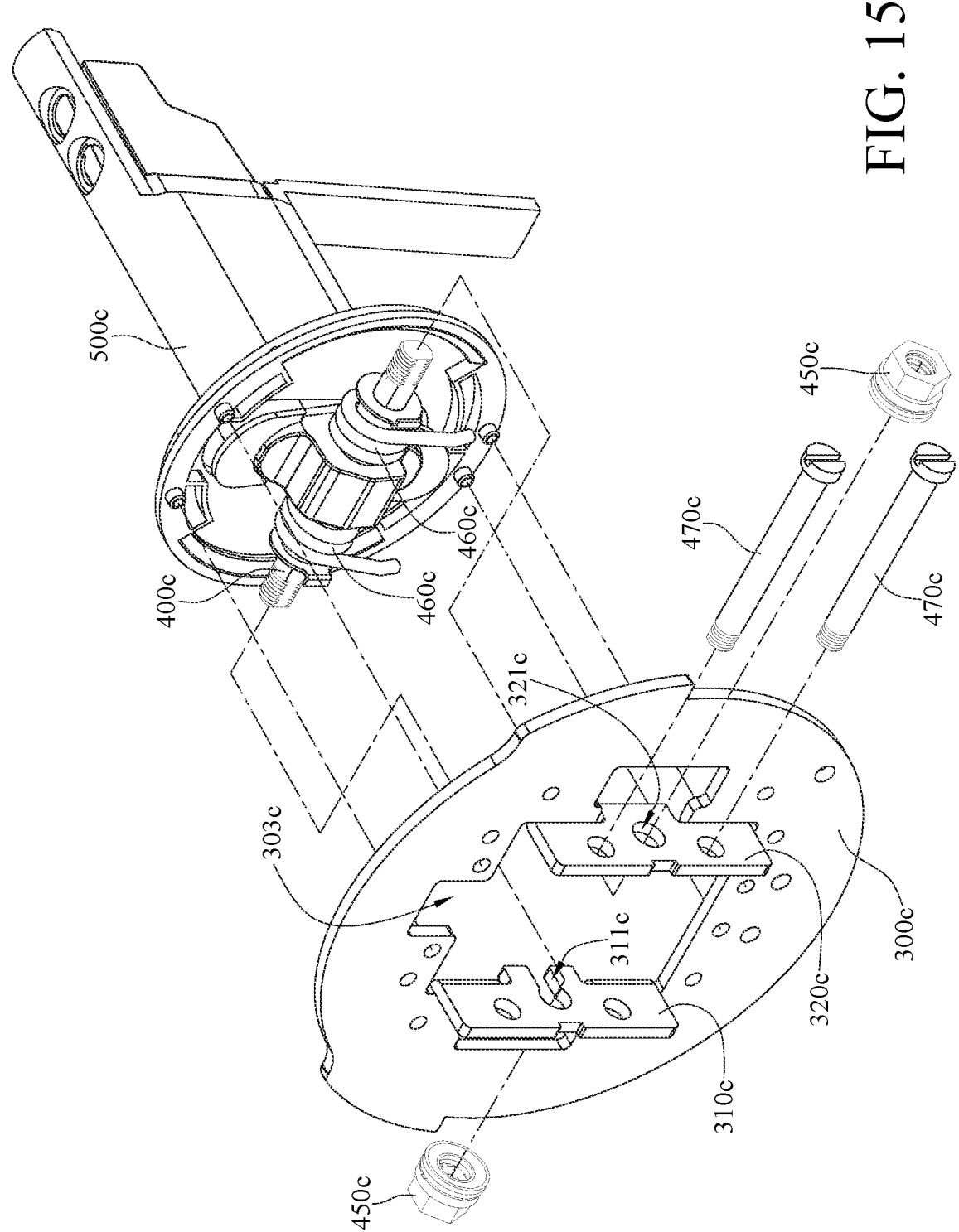
FIG. 15 is an exploded view of the biaxial pivoting mechanism in FIG. 14.

Note that dividing the main body 300b into the two pieces (i.e., the assembly pieces 310b and 320b) is not intended to limit the present disclosure. Please refer to FIG. 14 to FIG. 15, where FIG. 14 is a partial and exploded view of a holder and a biaxial pivoting mechanism of an angle adjustment device according to a fourth embodiment of the present disclosure, and FIG. 15 is an exploded view of the biaxial pivoting mechanism in FIG. 14. In this embodiment, a biaxial pivoting mechanism 40c is similar to the biaxial pivoting mechanism 40b shown in FIG. 9, and therefore a description of similar parts such as the rotatable connector 200c, the pivot 400c, the fasteners 450c, the elastic components 460c, the reinforcement rods 470c, and the mount base 500c would not be provided again. Only differences between this and the abovementioned embodiments will be described.

The main body 300c is manufactured in a single piece. The main body 300c, similar to that of the abovementioned embodiments, has a first surface 301c, a second surface 302c, and an accommodating space 303c. The second surface 302c is opposite to the first surface 301c. The accommodating space 303c extends to the second surface 302c from the first surface 301c. The main body 300c includes two side plates 310c and 320c respectively located at two opposite sides of the accommodating space 303c. The side plate 310c has a pivoting hole 311c, and the side plate 320c has a pivoting hole 321c. The pivoting hole 311c has an opening end, while the pivoting hole 321c is a full circular. In order to assemble the pivot 400c in the main body 300c, one end of the pivot 400c can be disposed through the pivoting hole 321c, and then the other end of the pivot 400c can be pushed into the pivoting hole 311c via its opening end. Accordingly, the pivot 400c can be assembled into the main body 300c of a single piece.

According to the biaxial pivoting mechanism and the angle adjustment device discussed above, at least part of the mount base is located in the accommodating space and located between the first surface and the second surface, the arrangement of which significantly reduces the thickness of the biaxial pivoting mechanism. Note that the thickness refers to the thickness of the biaxial pivoting mechanism excluding the mount base.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A biaxial pivoting mechanism, configured for connecting an object to a holder, comprising:
   a mount component, configured to be fixed to the object;
   a rotatable connector, rotatably disposed on the mount component about a first axis;
   a main body, fixed to the rotatable connector;
   a mount base, configured to be fixed to the holder, and the main body rotatably disposed on the mount base about a second axis not parallel to the first axis;
   a first pivot, disposed through the rotatable connector, wherein the first pivot comprises a root portion and a post portion that are connected to each other, the root portion is fixed to the mount component, and the rotatable connector is rotatably disposed around the root portion; and
   a first fastener, engaged with the post portion to clamp the rotatable connector between the root portion and the first fastener;
   wherein the main body has a first surface, a second surface, and an accommodating space, the first surface is located closer to the rotatable connector than the second surface, the accommodating space extends to the second surface from the first surface, and at least part of the mount base is located in the accommodating space.

2. The biaxial pivoting mechanism according to claim 1, further comprising a second pivot and two second fasteners, wherein the main body has two pivoting holes respectively located at two opposite sides of the accommodating space, two opposite ends of the second pivot are respectively inserted into the pivoting holes, the second fasteners are respectively engaged with the two opposite ends of the second pivot, and the mount base is fixed to the second pivot, such that the main body is rotatable with respect to the second pivot and the mount base.

3. The biaxial pivoting mechanism according to claim 1, further comprising a second pivot, wherein the second pivot is disposed through the main body and disposed to the mount base, and a part of the second pivot is located in the accommodating space of the main body.

4. The biaxial pivoting mechanism according to claim 2, further comprising at least one elastic component disposed on the second pivot, wherein an end of the at least one elastic component is fixed to the mount base, and another end of the at least one elastic component is fixed to the main body.

5. The biaxial pivoting mechanism according to claim 1, further comprising a spacer stacked on the mount component, wherein the spacer includes at least one positioning bent tab extending towards the rotatable connector, the rotatable connector has at least one positioning hole, and the at least one positioning bent tab is engaged with the at least one positioning hole, such that the spacer is rotatable together with the rotatable connector.

6. The biaxial pivoting mechanism according to claim 1, wherein the rotatable connector includes at least one bump structure protruding outwards from a side thereof facing towards the mount component, and the rotatable connector touches the mount component with the at least one bump structure.

7. The biaxial pivoting mechanism according to claim 1, further comprising a wear pad clamped between the mount component and the rotatable connector, wherein a wear resistance of the wear pad is greater than a wear resistance of the mount component.

8. The biaxial pivoting mechanism according to claim 1, wherein the main body comprises two assembly pieces, and the assembly pieces assembled together to form the accommodating space therebetween.

9. A biaxial pivoting mechanism, configured for connecting an object to a holder, comprising:
   a mount component, configured to be fixed to the object, wherein the mount component has an opening;
   a rotatable connector, rotatably disposed in the opening of the mount component about a first axis;
   a main body, fixed to the rotatable connector;
   a mount base, configured to be fixed to the holder, wherein the main body is rotatably disposed on the mount base about a second axis not parallel to the first axis;
   a pivot; and
   two fasteners;
   wherein the rotatable connector has a first surface, a second surface, and an accommodating space, the first surface of the rotatable connector is opposite to the second surface of the rotatable connector, the accommodating space of the rotatable connector extends to the second surface of the rotatable connector from the first surface of the rotatable connector, and at least part of the mount base is located in the accommodating space of the rotatable connector;
   wherein the main body has a first surface, a second surface, and an accommodating space, the second surface of the main body is opposite to the first surface of the main body, the accommodating space of the main body extends to the second surface of the main body from the first surface of the main body, the main body includes two side plates located at two opposite sides of the accommodating space of the main body, the side plates each have a pivoting hole, two opposite ends of the pivot are respectively inserted into the pivoting holes, the fasteners are respectively engaged with the two opposite ends of the pivot, the mount base is fixed to the pivot, such that the main body is rotatable with respect to the pivot and the mount base, and at least part of the pivot and at least part of the mount base are located in the accommodating space of the main body.

10. The biaxial pivoting mechanism according to claim 9, further comprising a positioning plate fixed to the rotatable connector, wherein the positioning plate and the main body together form an annular accommodation space therebetween and around the rotatable connector, a portion of the mount component surrounding to the opening is located in the annular accommodation space, and the mount component is rotatable with respect to the rotatable connector and the main body in the annular accommodation space.

11. The biaxial pivoting mechanism according to claim 10, further comprising a cover that is disposed on a side of the positioning plate located away from the rotatable connector.

12. The biaxial pivoting mechanism according to claim 9, further comprising at least one elastic component disposed on the pivot, wherein an end of the at least one elastic component is fixed to the mount base, and another end of the at least one elastic component is fixed to the main body.

13. The biaxial pivoting mechanism according to claim 9, wherein the main body comprises two assembly pieces, the side plates are respectively disposed on the assembly pieces, and the assembly pieces are assembled together to form the accommodating space of the main body therebetween.

14. The biaxial pivoting mechanism according to claim 9, further comprising at least one reinforcement rod disposed through the side plates of the main body.

15. An angle adjustment device, comprising:
   a holder, comprising:
      a base;
      a stand, standing on the base; and
      a pivotable connector, pivotably disposed on the stand about a reference axis;
   an object;
   a pivot;
   two fasteners; and
   a biaxial pivoting mechanism, comprising:
      a mount component, fixed to the object;
      a rotatable connector, rotatably disposed on the mount component about a first axis;
      a main body, fixed to the rotatable connector; and
      a mount base, fixed to the holder, wherein the main body is rotatably disposed on the mount base about a second axis not parallel to the first axis;
   wherein the main body has a first surface, a second surface, and an accommodating space, the first surface is located closer to the rotatable connector than the second surface, the accommodating space extends to the second surface from the first surface, the main body includes two side plates located at two opposite sides of the accommodating space, the side plates each have a pivoting hole, two opposite ends of the pivot are respectively inserted into the pivoting holes, the fasteners are respectively engaged with the two opposite ends of the pivot, the mount base is fixed to the pivot, such that the main body is rotatable with respect to the pivot and the mount base, and at least part of the pivot and at least part of the mount base are located in the accommodating space.

16. The angle adjustment device according to claim 15, further comprising a first pivot and a first fastener, wherein the first pivot is disposed through the rotatable connector, the first pivot comprises a root portion and a post portion that are connected to each other, the root portion is fixed to the mount component, the rotatable connector is rotatably disposed around the root portion, and the first fastener is engaged with the post portion to clamp the rotatable connector between the root portion and the first fastener.

17. The angle adjustment device according to claim 15, wherein the mount component has an opening, the rotatable connector is rotatably disposed in the opening of the mount component about the first axis, the rotatable connector has a first surface, a second surface, and an accommodating space, the first surface of the rotatable connector is opposite to the second surface of the rotatable connector, the accommodating space of the rotatable connector extends to the second surface of the rotatable connector from the first surface of the rotatable connector, and at least part of the mount base is located in the accommodating space of the rotatable connector.

* * * * *